Oct. 31, 1961 J. J. HAGOPIAN 3,007,144

DATA STORAGE APPARATUS

Filed May 14, 1956 5 Sheets-Sheet 1

INVENTOR.
JACOB J. HAGOPIAN

BY John O. Clark

ATTORNEY

Oct. 31, 1961 J. J. HAGOPIAN 3,007,144

DATA STORAGE APPARATUS

Filed May 14, 1956 5 Sheets-Sheet 2

Oct. 31, 1961 J. J. HAGOPIAN 3,007,144

DATA STORAGE APPARATUS

Filed May 14, 1956 5 Sheets-Sheet 3

Oct. 31, 1961 J. J. HAGOPIAN 3,007,144

DATA STORAGE APPARATUS

Filed May 14, 1956 5 Sheets-Sheet 4

Oct. 31, 1961 J. J. HAGOPIAN 3,007,144

DATA STORAGE APPARATUS

Filed May 14, 1956 5 Sheets-Sheet 5

3,007,144
Patented Oct. 31, 1961

3,007,144

DATA STORAGE APPARATUS

Jacob J. Hagopian, Santa Clara County, Calif., assignor to International Business Machines Corporation, New York, N.Y., a corporation of New York Filed May 14, 1956, Ser. No. 584,705
10 Claims. (Cl. 340—174.1)

The present invention pertains generally to random access storage devices and relates more particularly to such devices utilizing positionable transducers for reading or recording data at selected locations therein.

When recording data on magnetic drums or discs, etc., random access to data on selected tracks has been attained in the past by providing transducers for each track and by switching to render transducers associated with selected tracks operative. In this case access time is limited only by switching time. When very large quantities of data are to be made available at random, however, the large number of transducers required cause this method to become economically impracticable.

The present invention utilizes a small number of transducers compared to the number of storage tracks and the transducers are selectively positionable to the various tracks. In brief, the machine includes a plurality of magnetic discs supported for rotation on a common shaft and a transducer associated with each disc face. The various transducers are ganged for controlled, conjoint movement to selected tracks and switching is provided to render the transducers associated with a particular one of these tracks effective.

Thus, it is one object of the present invention to provide an improved data storage device.

Another object is to provide a data storage apparatus of high storage capacity and having rapid access at random to any storage location.

A further object is to provide a magnetic memory utilizing multiple magnetic discs mounted on a common shaft wherein a transducer is associated with each disc and these transducers are ganged for movement conjointly to selected tracks on the various discs.

Another object is to provide a storage device wherein a plurality of transducers are movable to selected tracks on members corresponding thereto for cooperation with circuits for rendering selected transducers effective.

Still another object is to provide a magnetic memory device wherein magnetic transducers are moved under the control of address instructions to specific recording areas on each of a plurality of magnetic discs whereby a specific transducer may be rendered effective according to the address instructions.

Another feature of the present invention is the provision of a novel vernier device for controlling the fine adjustment necessary to accurately locate the various transducers at selected tracks. According to this feature, an apparatus responsive to signals sensed by a transducer after the transducer has been roughly located at a track is operative to control positioning of the transducer to reference it accurately to the track.

Thus, it is another object to provide a data storage device having an improved structure for effecting fine positioning of a movable transducer.

A still further object is to provide a vernier control for movable transducers associated with a storage apparatus wherein the fine positioning is under the control of sensed signals.

Still another object is to provide a transducer and movable support therefor wherein positioning of the transducer is under control of signals sensed by the transducer.

A further object is to provide a storage device utilizing multiple magnetic discs having pluralities of storage tracks wherein timing signals are provided on tracks of one disc corresponding to tracks of other discs and transducers associated with the discs are ganged with the transducer associated with the timing disc for movement conjointly to storage tracks and corresponding timing tracks.

Other objects of the invention will be pointed out in the following description and claims and illustrated in the accompanying drawings, which disclose, by way of example, the principle of the invention and the best mode which has been contemplated of applying that principle.

Figure 9A:
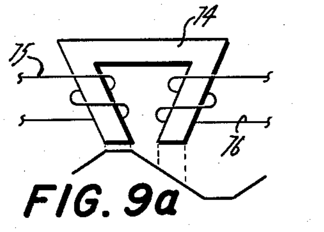
Figure 9B:
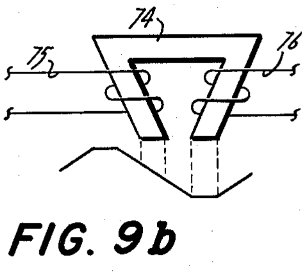
Figure 7:
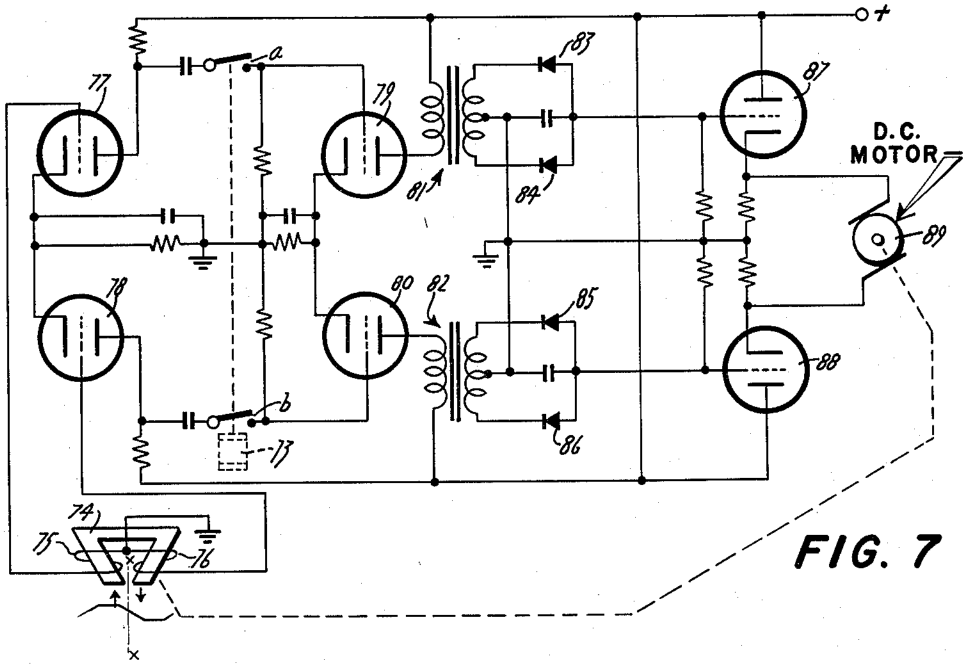
FIG. 7 is one embodiment of the fine positioning structure of the invention.

FIGS. 9*a* and 9*b* show the timing transducer of the circuit shown in FIG. 7 disposed on either side of the center of the timing track.

Figure 10:
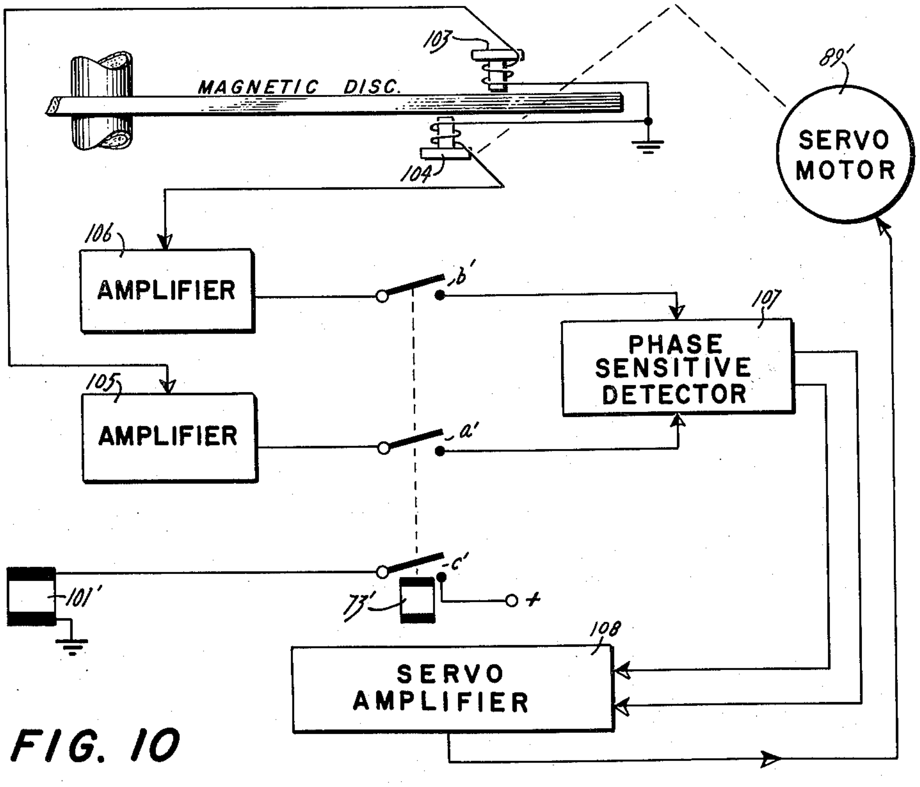

FIG. 10 is a block diagram of another embodiment of the fine positioning mechanism of the invention.

Figure 1:
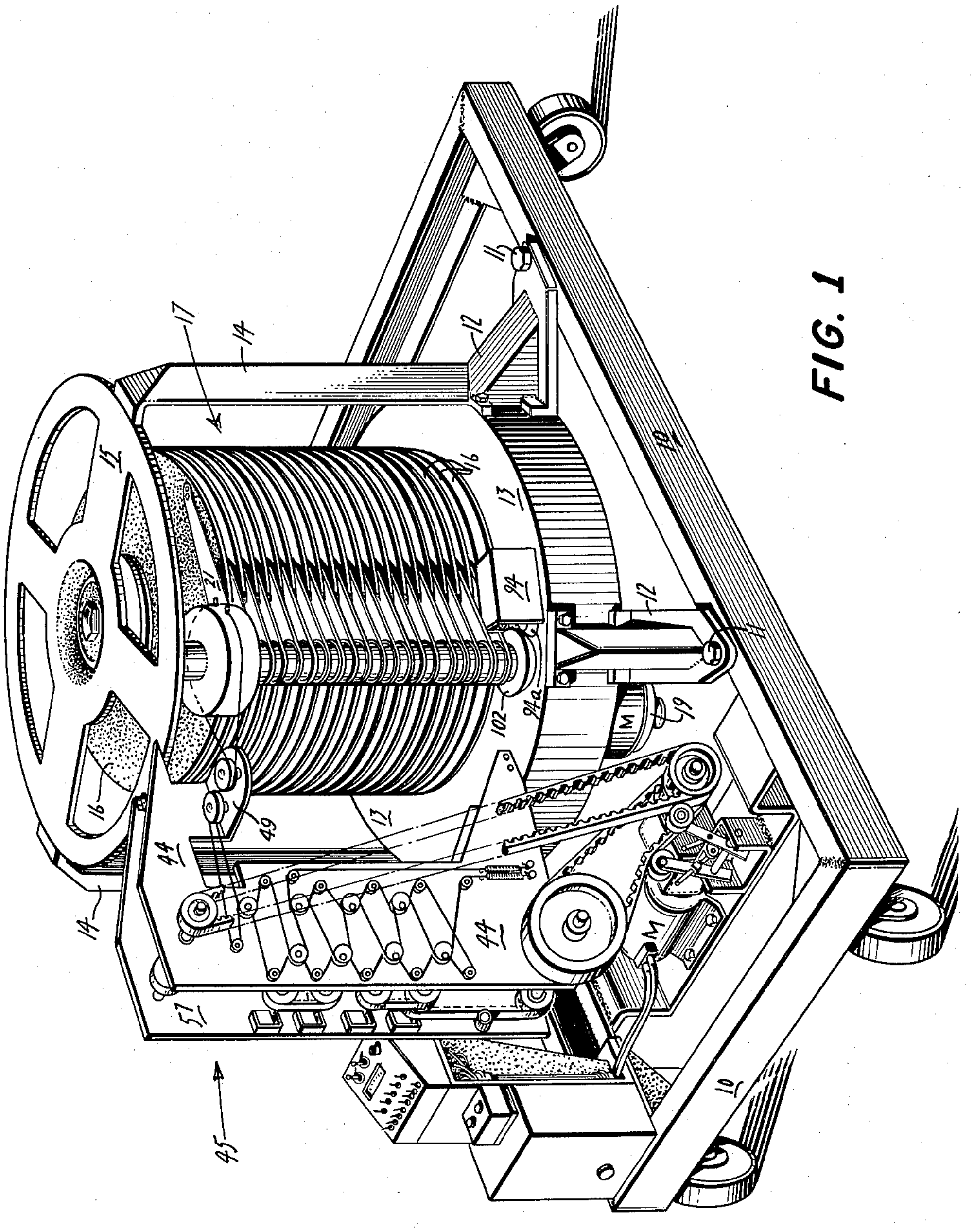
FIG. 1 is a perspective view of the machine of the invention.

Referring now to FIG. 1, the machine of the invention generally comprises a frame 10 for supporting the various components of the assembly. Secured to the frame 10 by bolts 11 are a plurality of brackets 12 (only two being shown in the drawing) which are provided to support a base member 13. Two of the brackets 12 are formed integrally with arms 14 which extend upwardly for connection to a top member 15 for supporting this member in spaced relation to the member 13. The various discs 16 of an array 17 are disposed intermediately of the members 13 and 15, these discs being keyed to a shaft 18 (see FIG. 2) in spaced relation for rotation therewith. The shaft 18 is journaled in suitable bearings (not shown) provided therefor in members 13 and 15 (FIG. 1), and a motor 19 affixed to the member 13 therebeneath is provided to drive the shaft and discs at the desired speed. While the machine is in use, the motor 19 is constantly energized to thereby continuously rotate the shaft 18 and discs 16.

Each of the discs 16 is provided with magnetizable surfaces for recording data thereon magnetically as is well known. Each face of each disc 16 (FIG. 2) is arranged to cooperate with a corresponding magnetic transducer 20, not shown in detail, supported thereadjacent by the corresponding one of a plurality of arms 21. The transducers 20 may be of any desired type and it is preferred, although not mandatory, that they utilize an air bearing to space the transducer from the recording surface in a manner the same as or similar to that disclosed in either of the copending applications Serial No. 456,189, filed September 15, 1954, or Serial No. 406,011, filed January 25, 1954.

Figure 2:
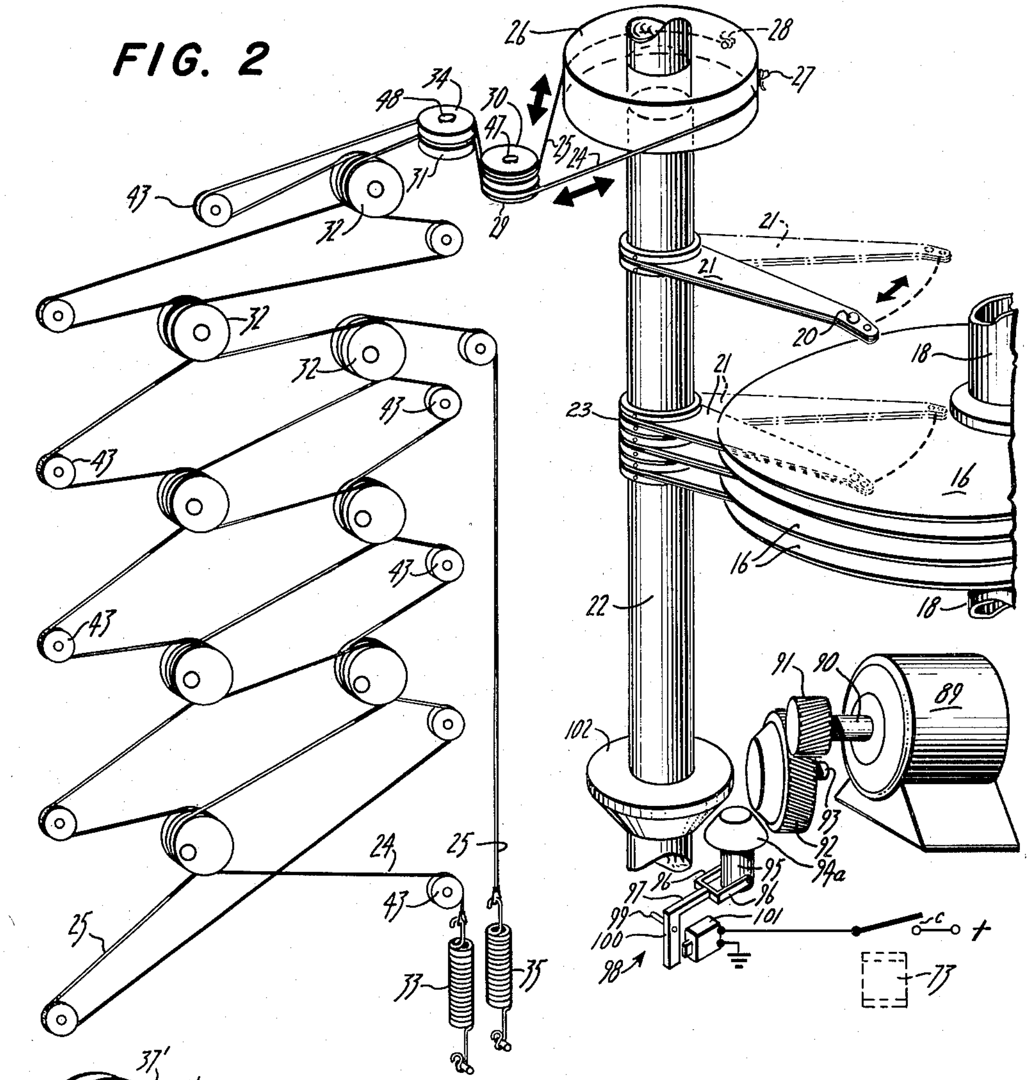
FIG. 2 is a schematic diagram of the rough positioning mechanism of the invention.

The various arms 21, with the exception of the arms 21 cooperating with the upper surface of the top disc and the lower surface of the bottom disc, are arranged in pairs for insertion between opposed disc faces (see FIG. 2). All of the arms 21 are keyed to a vertical shaft 22, adjacent pairs being spaced apart by spacers 23 releasably secured to the shaft 22. In the instant machine, an air bearing of the type disclosed in the aforementioned application Serial No. 456,189 is utilized, and each of the arms 21 is provided with a set to place the transducers against their corresponding discs. The shaft 22 is journaled in suitable bearings (not shown) provided in the members 13 and 15 (FIG. 1) for limited rotary movement, as will be explained hereinafter. The arms 21 are arranged to dispose the transducers 20 in operative relation to surfaces of the corresponding disc faces, and it will be understood that controlled rotary positioning of the shaft 22 results in controlled positioning of the transducers 20 at selected radii of the discs. The various circular paths defined by the transducers relative to the rotating discs at the various radii are referred to herein as data storage tracks, or merely as tracks, and the transducers are therefore positioned conjointly to corresponding tracks under the control of the shaft 22.

Figure 3:
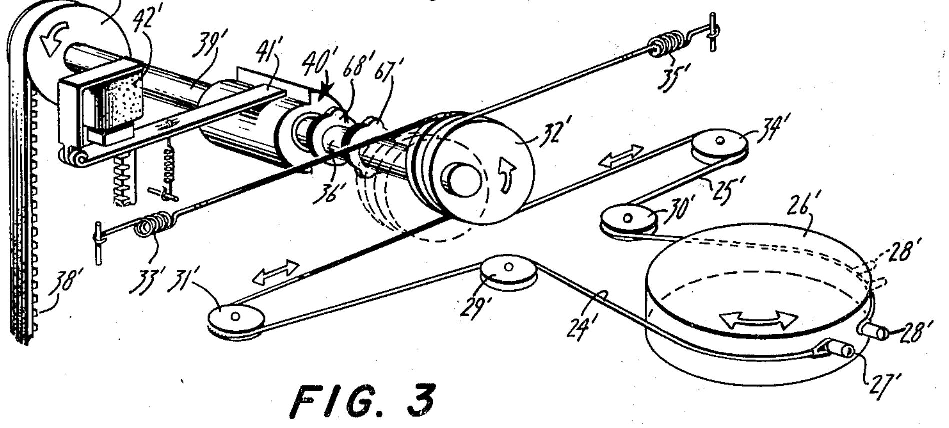
FIG. 3 is a simplified schematic diagram of a portion of the positioning mechanism shown in FIG. 2.

The shaft position, and thus the position of the transducers 20, is roughly controlled by a network of cables 24 and 25 in a manner disclosed in FIG. 2. Referring first to FIG. 3, a purely diagrammatic illustration of the rough positioning mechanism is shown. This figure is utilized to illustrate the principles of operation of this mechanism. A capstan 26′ is provided with studs 27′ and 28′ which secure one end of the corresponding one of the two cables 24′ and 25′ thereto. The cables 24′ and 25′ are arranged to extend partially around the capstan 26′ and around guide pulleys 29′ and 30′, respectively, as shown in the drawing. From the pulley 29′ the cable 24′ extends around a guide pulley 31′ and around an eccentric 32′ to one end of a spring 33′, the other end of which is fixed. Similarly, the cable 25′ extends from the pulley 30′ around a pulley 34′ and around the eccentric 32′ to one end of a spring 35′. The cables 24′ and 25′ extend around the eccentric 32′ in opposite directions, and if the eccentric is moved from the position shown in full lines in FIG. 3 to the dotted line position, the capstan 26′ is rotated in a counterclockwise direction, the degree of rotation being determined by the degree of eccentricity of the eccentric 32′. It should be noted at this time that the springs 33′ and 35′ are provided to take up any slack in the system as well as to permit the operation of a fine positioning mechanism, to be described.

The eccentric 32′ is keyed to a shaft 36′ which is driven by a pulley 37′, belt 38′ and shaft 39′ through a suitable one-half revolution clutch 40′ the belt 38′ being arranged to continuously drive the pulley 37′ and shaft 39′. When the armature 41′ of a magnet 42′ is raised by momentarily energizing the magnet 42′, the clutch 40′ engages and the eccentric 32′ rotates for one-half revolution, thereby rotating the capstan 26′ in the manner described above. As mentioned previously, the structure shown in FIG. 3 and described above is not the actual structure utilized and merely demonstrates the principle of operation of the positioning mechanism of the invention. It is for this reason that the reference numerals used in connection with FIG. 3 are primed. Corresponding structure shown in FIGS. 1 and 2 is identified by similar reference numerals, the primes being omitted.

Figure 4:
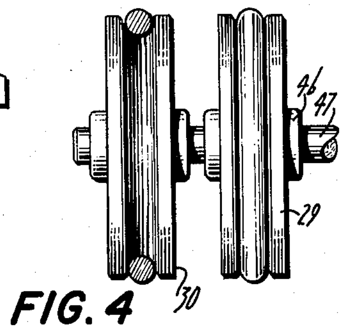
FIG. 4 is an elevation of a set of pulleys utilized herein.

Referring now to FIG. 2, the capstan 26 is secured to the shaft 22, the cables 24 and 25 being affixed to the capstan by studs 27 and 28, respectively. From the capstan 26, the cable 24 extends around pulleys 29 and 30 and around various eccentrics 32 and guide pulleys 43 to the spring 33, the other end of the spring being attached to a wall 44 of a housing 45 which is affixed to and supported by the members 13 and 15. The pulley 29 is provided with suitable bearings 46 (FIG. 4) and is mounted on a shaft 47 which additionally carries the pulley 30. In a similar manner, the pulleys 31 and 34 (FIG. 2) are journaled on a shaft 48, and the shafts 47 and 48 are securely attached to a flange 49 formed integrally with the wall 44 (FIG. 1). The cable 25 (FIG. 2) extends from the capstan 26 around pulleys 30 and 34 and around the various eccentrics 32 and guide pulleys 43 to one end of the spring 35, the other end of which is connected to the wall 44 (FIG. 1).

Figure 5:
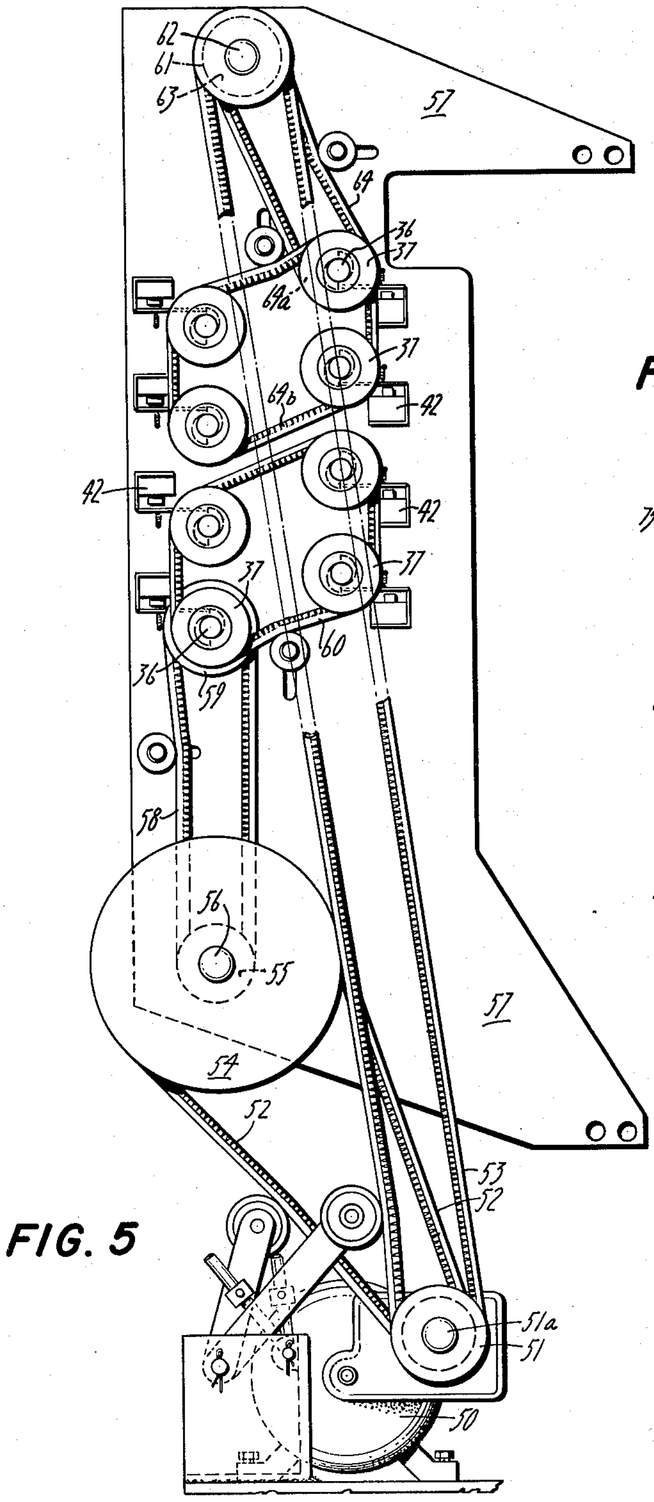
FIG. 5 is a partial elevation of a portion of the rough positioning mechanism, a cover plate having been removed.

The various guide pulleys 43 are rotatably mounted on suitable shafts which are affixed to the wall 44 of the housing 45, the various eccentrics 32 being keyed to corresponding shafts 36 which are journaled in and extend through the wall 44 to corresponding one-half revolution clutches 40 (FIG. 5). As was described above in connection with FIG. 3, the shafts 36 are driven one-half revolution by belts 38, pulleys 37 and shafts 39 (not shown in FIG. 5) when the corresponding magnets 42 are energized, thereby rotating the corresponding eccentrics one-half revolution. The degree of eccentricity of the eccentrics 32 may be that which is convenient. In the present embodiment the eccentrics 32 are arranged to displace the cables 24 and 25 sufficiently to rotate the capstan 26 and shaft 22 in binary increments of "1," "2," "4," "4," "10," "20," "40," and "40," "1" being the unit of spacing between adjacent tracks on the discs.

For lack of better terminology the eccentrics are referred to herein as being in their "home" position when they are in the positions shown in FIG. 2, i.e., when the capstan 26 is rotated fully in the clockwise direction to position the arms 21 and transducers 20 in the full line position shown in FIG. 2. When one of the magnets 42 is energized, the corresponding eccentric is rotated one-half revolution to a position referred to hereinafter as the "operated" position. Thus, when the magnets 42 are selectively energized, thereby selectively placing the eccentrics 32 in their home and operated positions, the capstan 26, and thus the arms 21 and transducers 20, are rotated in a counterclockwise direction to place the transducers 20 adjacent selected tracks on the discs 16 corresponding to the particular magnets energized. Suppose, for example, that it is desired to position the transducer at track #39. It will be understood that this may be accomplished by energizing the magnets 42 associated with the "1" eccentric, both of the "4" eccentrics, the "10" eccentric and the "20" eccentric to thereby move these eccentrics to their operated position. This is true since the sum of the displacements provided by these eccentrics is 39 units.

In the actual machine, as best seen in FIGS. 1 and 5, the eight pulleys 37 are driven by a motor 50 through a double pulley 51 and belts 52 and 53, the drive shaft of the motor 50 being suitably geared to a shaft **51*a* to which the pulley 51 is keyed. The belt 52 extends around a pulley 54, which, together with a pulley 55, is keyed to a shaft 56 journaled in bearings provided therefor in a wall 57 and the wall 44 of the housing 45. The pulley 55 is arranged to drive a belt 58 which in turn drives a pulley 59 keyed to one of the shafts 36 and thus drives four pulleys 37 by a belt 60. The belt 53 extends from the pulley 51 around a pulley 61 keyed to a shaft 62, as is a pulley 63. The pulley 63 is arranged to drive a belt 64 which extends around a pulley 64*a* keyed to another shaft 36. Thus, the pulley 64*a* is arranged to drive the four remaining pulleys 37 through a belt 64*b* which extends therearound. The motor 50, and thus the pulleys 37, are continuously driven while the machine is in operation. The various shafts 39 are continuously rotating and, if at any time one or more of the magnets 42 are energized, the associated clutches 40 are engaged, thereby rotating the corresponding eccentrics 32 one-half revolution and causing the arms 21** to be positioned as explained above.

Figure 6:
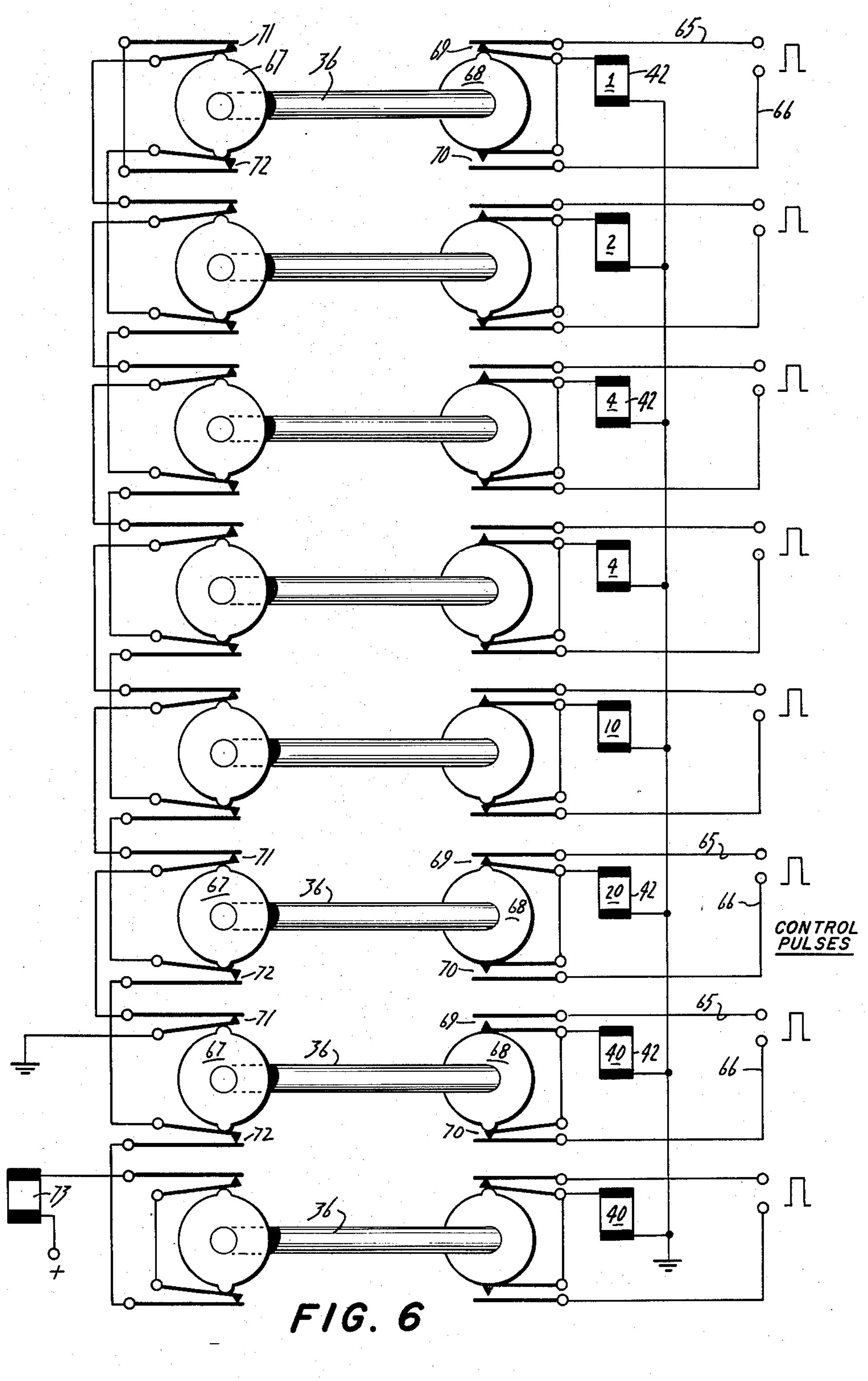
FIG. 6 is a schematic diagram of control circuits utilized herein.

The magnets 42 may be selectively energized in any convenient manner and in the present embodiment this is accomplished by means of the circuitry disclosed in FIG. 6. Each magnet has associated therewith two input lines 65 and 66, one of which, the line 65, controls the corresponding eccentric to be positioned in its home position, the other, the line 66, being utilized to control the corresponding eccentric to be positioned in its operated position. Each of the shafts 36, which, it will be recalled, are driven through the one-half revolution clutches 40, is arranged to carry a pair of cams 67 and 68 which are keyed thereto and which operate circuit breakers 69, 70, 71 and 72, as will be discussed. Considering for the moment the cam 68, this cam is provided to close the contacts of the circuit breaker 69 while the eccentric 32 associated therewith is in its operated position. Similarly, when this eccentric is in its home position, the contacts of the circuit breaker 70 are closed. Thus, when the contacts of the circuit breakers 69 and 70 associated with the "1" magnet 42 are in the condition shown in FIG. 6, it will be clear that a pulse entered on line 65 passes through the contacts of the circuit breaker 69 and through the "1" magnet 42 to ground, thereby energizing this magnet and causing the clutch 40 to engage and rotate the eccentric 32 to its home position. It should additionally be noted that if the cam 68 associated with the "1" magnet 42 is in the condition shown in the drawing and the line 66 is pulsed, nothing happens since at this time the contacts associated with the circuit breaker 70 are open. This is desired since, it will be recalled, pulsing the line 66 controls the eccentric 32 to be moved to its operated position and this eccentric is already in this position. Each of the remaining magnets 42 is operated in a similar manner by pulsing the desired one of the two lines 65 and 66 corresponding thereto.

Thus far, the mechanism which positions the various transducers roughly at the selected tracks of the disc array has been described. A fine positioning mechanism next to be described is arranged to accurately locate the various transducers at the selected tracks. This mechanism is effective only after the various eccentrics 32 have come to rest. As mentioned above, each of the shafts 36 has keyed thereto a cam 67 which is arranged to operate the corresponding circuit breakers 71 and 72. Each of the cams 67 is provided with two rises 180° apart, disposed in such a position that the circuit breakers 71 and 72 are closed thereby when the corresponding eccentric is in either its home or its operated position. When an eccentric 32 is disposed intermediately of these positions, however, the corresponding circuit breakers 71 and 72 are open. A relay 73 is connected between a positive potential and serially through the contacts of the various circuit breakers 71 and 72 to ground, and it will be clear, therefore, that when all of the various eccentrics are in either their home or their operated position, relay 73 is energized and its various contacts are transferred. If, however, any one of these eccentrics 32 is not in one of these positions, the relay 73 is not energized. Since the fine positioning mechanism next to be described is not rendered effective until the rough positioning by the various eccentrics is completed, it will be clear that the contacts of the relay 73 are suited to initiate the fine positioning operation.

Figure 8:
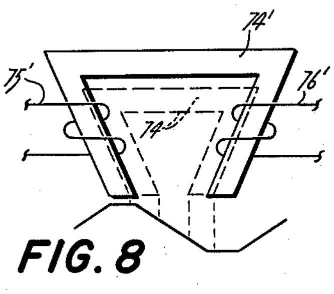
FIG. 8 depicts the method of recording timing tracks utilized in connection with the structure of FIG. 7.

Before proceeding with the description of the fine positioning mechanism, it should first be mentioned that in a preferred embodiment of the invention one of the discs 16 is provided with a plurality of timing tracks which correspond to the various storage tracks, the timing tracks being arranged at radii corresponding to the radii of the various storage tracks and being recorded on one disc face. In the preferred embodiment each of these tracks comprises two adjacent trains of clock pulses 180° out of phase. These tracks may be recorded with a transducer similar to but having a wider gap than a transducer 74 (FIG. 7) utilized for sensing the clock pulses, or they may be recorded with two separate transducers. Assuming that the clock tracks are to be recorded by a transducer 74' (FIG. 8) having a wider air gap than the transducer 74 shown in phantom lines in FIG. 8, one winding 75' thereof is energized by a suitable pulse-forming means, the other winding 76' being driven by the same source of pulses 180° out of phase therewith.

Referring now to FIG. 7, the transducer 74 is illustrated as being disposed above a timing track traveling out of the paper and inducing a signal in each of the two windings 75 and 76 of the transducer. The center of the timing track is indicated by a line *x*—*x*, and it will be understood that it is desired to center the transducer on this line, to thereby center all transducers on the tracks concerned. One side of each of the windings 75 and 76 is grounded and the other sides are connected to the control grids of corresponding vacuum tubes 77 and 78. The plates of these tubes are coupled through the *a* and *b* contacts, respectively, of the relay 73 to the control grids of two vacuum tubes 79 and 80, respectively. It will be noted that the *a* and *b* contacts of the relay 73 are normally open and that they are closed only while this relay is energized. The plates of the tubes 79 and 80 are connected through the primaries of two transformers 81 and 82, respectively, to B+, the secondaries being connected through diodes 83, 84 and 85, 86, respectively, to the control grids of two vacuum tubes 87 and 88, respectively, the center taps of these secondaries being grounded.

The diodes 83 and 84 provide full-wave rectification of the signals induced in the secondary of the transformer 81, the diodes 85 and 86 being arranged to provide similar rectification of the signals occurring across the secondary of the transformer 82. The cathodes of the tubes 87 and 88 are connected across a D.C. motor 89 which provides the fine positioning, and the direction of rotation of the motor 89 is determined by the signals induced in the windings 75 and 76, since these signals determine the bias on the tubes 87 and 88. Thus, if the signal induced in the winding 75 is of greater amplitude than the signal induced in the winding 76, as it is when the transducer 74 is positioned relative to the selected spaced clock tracks in the manner shown in FIG. 9*a*, the bias on the tube 87 exceeds the bias on the tube 88, thereby causing excitation current to flow through the motor 89 from the cathode of the tube 88 to the cathode of the tube 87 and rotating the armature 90 of the motor 89 in a first direction. Additionally, if the transducer 74 is positioned as shown in FIG. 9*b*, the opposite condition results and the motor is energized to rotate the armature 90 in the reverse direction.

Keyed to the armature 90 (FIG. 2) is a gear 91 arrange to mesh with and drive a gear 92 which is keyed to a shaft 93 journaled in suitable bearings provided therefor in a housing 94 (FIG. 1) affixed to the member 13. A face of the gear 92 (FIG. 2) is beveled for frictionally engaging the beveled surface of an idler 94*a* journaled on a shaft 95 which is supported between spaced arms 96 formed integrally with one arm 97 of a bell crank 98. The bell crank is pivoted on a stud 99 secured to the housing 94 (FIG. 1) and the downwardly extending arm 100 (FIG. 2) thereof is disposed adjacent an electromagnet 101. When the magnet 101 is energized, the bell crank is pivoted in a counterclockwise direction, as viewed in FIG. 2, thereby raising the shaft 95 and idler 94*a* for engaging the idler with the beveled surface of the gear 92. In addition, the beveled surface of the idler 94*a* is arranged to frictionally engage the beveled surface of a member 102 keyed to the shaft 22, and it should now be clear that while the magnet 101 is energized the motor 89 is arranged to drive the shaft 22 according to the signals induced in the windings 75 and 76 of the transducer 74 (FIG. 7).

One side of the magnet 101 (FIG. 2) is grounded, the other side thereof being connected through the n/o *c* contacts of the relay 73 to a positive potential. Thus, when the relay 73 is energized, these contacts are closed and the magnet 101 is energized, thereby raising the idler 94*a* into engagement with the gear 92 and the member 102. (It will be recalled that the relay 73 is energized when the apparatus is ready for the fine positioning operation.) The motor 89 is connected in such a way as to move the transducers in a direction which seeks to oppose any difference in the signals induced in the windings 75 and 76, and in this way the transducer 74 is positioned to center exactly on the imaginary line $x—x$ shown in FIG. 7. Thus, the transducers are continually servoed under the control of the corresponding clock track to remain accurately positioned relative to the various selected storage tracks.

The servo action described above in connection with FIG. 7 may be obtained in any one of a number of different ways, another such way being disclosed in FIG. 10. Referring to FIG. 10, a timing transducer 103 fixed to cooperate with a single timing track is provided on one of the discs, this track being of the conventional single signal variety. A second transducer 104, ganged mechanically with the remainder of the transducers 20 for movement therewith to the various tracks as described earlier, is provided to sense phasing tracks provided on one disc face as will be described. Each of these phasing tracks is of the conventional single signal variety. The various phasing tracks are recorded in such a way that the signals taken from alternate phasing tracks are 180° out of phase with the signals taken from the timing track, the signals taken from the remaining phasing tracks being in phase with the signals taken from the timing track. The phasing tracks are located physically in such a way that when the transducers 20 associated with the storage tracks are located accurately at a given storage track, the phasing transducer 104 is disposed intermediately of adjacent phasing tracks. Conversely, when the phasing transducer 104 is disposed intermediately of adjacent phasing tracks, the storage transducers 20 are accurately positioned at the corresponding storage track. The phasing transducer is arranged to sense adjacent phasing tracks, and when it is disposed centrally of the adjacent tracks the net signal induced in the winding thereof is zero. However, if the transducer 104 is displaced relative to the center of adjacent phasing tracks, the net signal induced in the winding thereof will have some magnitude and will be either in phase or out of phase with the signal resulting from the timing track, depending upon which side of center the transducer 104 is disposed. The servo action utilized herein is controlled by the phase of the signals taken from the phasing transducer to drive the array of transducers to locate the transducer 104 centrally of the phasing track concerned to thereby dispose the remaining transducers 20 at the selected track.

Referring to FIG. 10, the signals sensed by the transducers 103 and 104 are amplified by amplifiers 105 and 106, respectively, the outputs of which are connected through the $a'$ and $b'$ contacts of a relay 73' to the inputs of a phase-sensitive detector 107. The output of the detector 107 is amplified by an amplifier 108 from which the resulting signal is taken for driving a motor 89'. The motor is geared to the shaft 22 in any convenient manner, such as that described above in connection with the motor 89, and it is connected to move the transducers in a direction which reduces the net signal sensed by the transducer 104, thereby accurately positioning the transducer 104, together with the various storage transducers, on the selected tracks.

It should now be clear that to position the various transducers at a selected storage track the various lines 65 and 66 (FIG. 6) are pulsed according to the address of the selected track, thereby controlling the various eccentrics to be disposed in the positions corresponding to the address. This causes the shaft 22 (FIG. 2) to be rotated to place the transducers roughly at the selected address. When so positioned, the various cams 67 and 68 (FIG. 6) secured to the shafts 36 are in a position wherein one or the other of the various circuit breakers 69 or 70 associated with each cam 68 is closed, and also the various circuit breakers 71 and 72 associated with each cam 67 are closed. When this occurs, it will be recalled, the relay 73 is energized, thereby rendering the fine positioning mechanism effective to position the various transducers accurately at the desired address. Although not shown in the drawings, it will be understood that any convenient circuitry may be provided for rendering the transducers associated with selected tracks operative, and data is therefore entered on or read from selected tracks by switching the transducers associated with selected tracks into suitable read-write circuitry. For example, the read winding of each of the various storage transducers may connect directly to a corresponding amplifier, the output of which may connect through a conventional relay point matrix to data handling circuits whereby data from selected transducers is entered into these circuits according to the condition of the relays of the matrix. Similarly, a write amplifier may be connected between the data handling circuits and one side of a similar relay point matrix, the output of which connects to the various transducers. In this way data may be recorded on selected tracks of the storage medium according to the condition of these relays.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A data storage apparatus comprising in combination an index disc including a plurality of circumferentially disposed radially spaced index tracks having a predetermined center to center spacing, an index signal magnetically recorded centrally on each said track, a pair of magnetic index transducers each of which is operable to provide a signal whose amplitude varies in accordance with the radial displacement of the transducer from the center line of an associated index track, means mounting said index transducers in spaced relation to each other in a radial direction relative to said circumferentially disposed index tracks and for a distance different from said predetermined center to center spacing of said tracks, a data record disc, means for rotating said discs on a common axis, a data transducer operatively associated with said data disc for magnetically recording and reproducing data signals therefrom, means for moving said transducers relative to said respective discs conjointly along a path transverse to said tracks, first means for actuating said moving means in response to an address signal to roughly position said data transducer at a selected location along said path and second means for actuating said moving means in response to control signals, circuit means for generating said control signals from the index signals provided by said index transducers, and means connecting said circuit means between said index transducers and said second actuating means whereby the ultimate position of said data transducer relative to said data record is under the supervision of the control signal provided by said circuit means and corresponds to a reference line intermediate two of said index tracks.

2. The combination recited in claim 1 in which index signals on adjacent index tracks comprise similar clock signals recorded 180° out of phase.

3. A data storage apparatus comprising in combination an index member including a plurality of spaced index tracks, an index manifestation disposed centrally on each said track, an index transducer for scanning said index track to provide a continuous signal whose amplitude varies in accordance with the transverse displacement of the transducer from the center line of an associated index track, means for determining on which side of said center line said transducer is displaced, a data record member, means for moving said members conjointly in a direction parallel to said tracks, a data transducer operatively associated with said data record member for magnetically recording and reproducing data signals therefrom, means for moving said transducers relative to said respective members conjointly along a path transverse to said tracks, means for actuating said moving means in response to control signals, circuit means for generating said control signals from the index signals provided by said index transducer, and means connecting said circuit means between said index transducer and said actuating means whereby the ultimate position of said data transducer relative to said data record member is under the supervision of the control signal provided by said circuit means.

4. A data storage apparatus comprising in combination an index member including a plurality of spaced index tracks, an index manifestation recorded centrally on each said track, an index transducer for scanning said index manifestation to provide a signal whose amplitude varies in accordance with the transverse displacement of the transducer from the center line of an associated track, means for determining on which side of said center line said transducer is displaced, a data record member, means for moving said members conjointly in a direction parallel to said tracks, a data transducer operatively associated with said data record member for magnetically recording and reproducing data signals therefrom, means for moving said transducers relative to said respective members conjointly along a path transverse to said tracks, first means for actuating said moving means to roughly position said data transducer at a selected location along said path and second means for actuating said moving means in response to control signals, circuit means for generating said control signals from the index signal provided by said index transducer, and means connecting said circuit means between said index transducer and said second actuating means whereby the ultimate position of said data transducer relative to said data record member is under the supervision of the control signal provided by said circuit means.

5. A data storage apparatus comprising in combination an index member including a plurality of spaced index tracks having a predetermined center to center spacing, a binary signal magnetically recorded centrally on each said track, said signals on adjacent tracks being recorded out of phase, a magnetic index transducer for scanning said index tracks to provide a signal whose amplitude varies in accordance with the transverse displacement of the transducer from the center line of an associated index track, a data record member, means for rotating said members on a common axis, a data transducer operatively associated with said data record member for magnetically recording and reproducing data signals therefrom, means for moving said transducers relative to said respective members conjointly along a path transverse to said tracks, first means for actuating said moving means in response to an address signal to roughly position said data transducer at a selected location along said path, second means for actuating said moving means in response to control signals, after said data transducer is roughly positioned, circuit means for generating said control signals from the index signals provided by said index transducer and a timing signal which is in phase with one of said binary signals, means for generating said timing signal, means connecting said circuit means to said index transducer, means connecting said timing signal generating means to said circuit means, and means connecting said circuit means to said second actuating means whereby the ultimate position of said data transducer relative to said data record is under the supervision of the control signal provided by said circuit means, and corresponds positionwise to a reference line intermediate two of said index tracks.

6. A data storage apparatus comprising in combination an index member including a plurality of spaced index tracks have a predetermined center to center spacing, an index manifestation recorded centrally on each said track, a pair of index transducers each of which scans an index track to provide a signal whose amplitude varies in accordance with the transverse displacement of the transducer from the center line of an associated index track, means mounting said index transducers in spaced relation to each other in a direction transverse to said index tracks and for a distance different from said predetermined center to center spacing of said tracks, a data record member, means for rotating said members conjointly on a common axis, a data transducer operatively associated with said data disc for magnetically recording and reproducing data signals therefrom, means for moving said transducers relative to said respective members conjointly along a path transverse to said tracks, means for actuating said moving means in response to control signals, circuit means for generating said control signals from the index signals provided by said index transducers, and means connecting said circuit means between said index transducers and said actuating means whereby the ultimate position of said data transducer relative to said data record is under the supervision of the control signal provided by said circuit means.

7. A data storage apparatus comprising in combination an index member including a plurality of spaced index tracks having a predetermined center to center spacing, an index signal manifestation recorded centrally on each said track, a pair of index transducers each of which scans an index track to provide a signal whose amplitude varies in accordance with the transverse displacement of the transducer from the center line of an associated index track, means mounting said index transducers in spaced relation to each other in a direction transverse to said index tracks and for a distance different from said predetermined center to center spacing of said tracks, a data record member, means for rotating said members conjointly on a common axis, a data transducer operatively associated with said data disc for magnetically recording and reproducing data signals therefrom, means for moving said transducers relative to said respective members conjointly along a path transverse to said tracks, first means for actuating said moving means to roughly position said data transducer at a selected location along said path and second means for actuating said moving means in response to control signals, circuit means for generating said control signals from the index signals provided by said index transducers, and means connecting said circuit means between said index transducers and said second actuating means whereby the ultimate position of said data transducer relative to said data record is under the supervision of the control signal provided by said circuit means.

8. A data storage apparatus comprising in combination an index member including a plurality of spaced index tracks having a predetermined center to center spacing, an index manifestation recorded centrally on each said track, a pair of index transducers each of which scans an index track to provide a signal whose amplitude varies in accordance with the transverse displacement of the transducer from the center line of an associated index track, means mounting said index transducer in spaced relation to each other in a direction transverse to said index tracks and for a distance different from said predetermined center to center spacing of said tracks, a data record member, means for rotating said members conjointly on a common axis, a data transducer operatively associated with said data record member for magnetically recording and reproducing data signals therefrom, means for moving said transducers relative to said respective members conjointly along a path transverse to said tracks, first means for actuating said moving means in response to an address signal to roughly position said data transducer at a selected location along said path, and second means for actuating said moving means in response to control signals, circuit means for generating said control signals from the index signals provided by said index transducers, and means connecting said circuit means between said index transducers and said second actuating means whereby the ultimate position of said data transducer relative to said data record is under the supervision of the control signal provided by said circuit means.

9. A data storage apparatus comprising in combination an index member including a plurality of spaced index tracks having a predetermined center to center spacing, an index signal magnetically recorded centrally on each said track, a pair of magnetic index transducers each of which is operable to provide a signal whose amplitude varies in accordance with the transverse displacement of the transducer from the center line of an associated index track, means mounting said index transducers in spaced relation to each other in a direction transverse to said index tracks and for a distance different from said predetermined center to center spacing of said tracks, a data record member, means for rotating said members on a common axis, a data transducer operatively associated with said data record member for magnetically recording and reproducing data signals therefrom, means for moving said transducers relative to said respective members conjointly along a path transverse to said tracks, means for actuating said moving means in response to control signals, circuit means for generating said control signals from the index signals provided by said index transducers, and means connecting said circuit means between said index transducers and said actuating means whereby the ultimate position of said data transducer relative to said data record is under the supervision of the control signal provided by said circuit means.

10. The combination recited in claim 9 in which index signals on adjacent index tracks comprise similar binary signals recorded 180° out of phase.

References Cited in the file of this patent

UNITED STATES PATENTS

| | | |
|---|---|---|
| 2,537,770 | Livingston | Jan. 9, 1951 |
| 2,690,913 | Rabinow | Oct. 5, 1954 |
| 2,733,425 | Williams et al. | Jan. 31, 1956 |
| 2,811,709 | Haselton | Oct. 29, 1957 |